(12) United States Patent
Masuda

(10) Patent No.: US 9,828,916 B2
(45) Date of Patent: Nov. 28, 2017

(54) FUEL SYSTEM

(71) Applicant: IHI Corporation, Koto-ku (JP)

(72) Inventor: Seiei Masuda, Tokyo (JP)

(73) Assignee: IHI Corporation, Koto-ku (JP)

( * ) Notice: Subject to any disclaimer, the term of this patent is extended or adjusted under 35 U.S.C. 154(b) by 237 days.

(21) Appl. No.: 14/740,765

(22) Filed: Jun. 16, 2015

(65) Prior Publication Data
US 2015/0285150 A1 Oct. 8, 2015

Related U.S. Application Data

(63) Continuation of application No. PCT/JP2014/050468, filed on Jan. 14, 2014.

(30) Foreign Application Priority Data

Jan. 18, 2013 (JP) ................. 2013-007755

(51) Int. Cl.
F02C 7/22 (2006.01)
F02C 7/236 (2006.01)
(Continued)

(52) U.S. Cl.
CPC .............. F02C 7/236 (2013.01); F02C 7/232 (2013.01); F02C 7/32 (2013.01); F02C 9/22 (2013.01);
(Continued)

(58) Field of Classification Search
CPC .. F02C 7/22; F02C 7/236; F02C 7/232; F02C 7/32; F02C 9/28; F02C 9/30
See application file for complete search history.

(56) References Cited

U.S. PATENT DOCUMENTS 2,599,680 A 6/1952 Weeks
2,669,838 A 2/1954 Lee, II
(Continued)

FOREIGN PATENT DOCUMENTS

EP 1 662 117 A2 5/2006
JP 48-072508 A 9/1973
(Continued)

OTHER PUBLICATIONS

International Search Report dated Mar. 11, 2014 for PCT/JP2014/050468 filed Jan. 14, 2014 with English Translation.
(Continued)

Primary Examiner — Steven Sutherland
(74) Attorney, Agent, or Firm — Oblon, McClelland, Maier & Neustadt, L.L.P.

(57) ABSTRACT

A fuel system includes a fuel pump formed of a constant-volume pump for changing a discharge flow rate in conjunction with a variation in a speed of revolution of a drive shaft, a boost pump disposed upstream from the fuel pump and formed of a constant-volume pump of which a discharge flow rate per unit of revolution of a drive shaft is greater than that of the fuel pump, a single electric motor rotationally driving the drive shaft of the fuel pump and the drive shaft of the boost pump in a state in which the speeds of revolution thereof are equal to each other, a return flow channel connecting an upstream side and a downstream side of the boost pump, and a relief valve disposed in the return flow channel and opened when an internal pressure of the return flow channel is greater than a reference pressure.

8 Claims, 7 Drawing Sheets

(51) Int. Cl.
*F02C 9/22* (2006.01)
*F02C 7/32* (2006.01)
*F02C 9/28* (2006.01)
*F02C 9/30* (2006.01)
*F02C 7/232* (2006.01)

(52) U.S. Cl.
CPC ............... *F02C 9/28* (2013.01); *F02C 9/30* (2013.01); *F05D 2220/323* (2013.01); *F05D 2260/4031* (2013.01); *Y02T 50/671* (2013.01)

(56) References Cited

U.S. PATENT DOCUMENTS

| | | | |
|---|---|---|---|
| 3,011,308 A | 12/1961 | Wotring | |
| 3,080,819 A | 3/1963 | Mayes | |
| 3,696,612 A * | 10/1972 | Berman | F02C 7/26 60/39.281 |
| 4,208,871 A * | 6/1980 | Riple, Jr. | F02C 9/30 417/1 |
| 6,321,527 B1 * | 11/2001 | Dyer | F02C 9/263 60/39.281 |
| 2004/0177602 A1 | 9/2004 | Griffiths et al. | |
| 2008/0236549 A1 * | 10/2008 | Bickley | F02C 7/232 123/504 |

FOREIGN PATENT DOCUMENTS

| | | |
|---|---|---|
| JP | 2002-303160 A | 10/2002 |
| JP | 2004-278502 A | 10/2004 |
| JP | 2004-353614 A | 12/2004 |
| WO | WO 92/07179 A1 | 4/1992 |

OTHER PUBLICATIONS

Morioka, N., et al., "Practical Development of Control Technology for the More Electric Engine," *IHI Engineering Review*, vol. 52, No. 1, 2012, pp. 43-52 (with English Abstract).

Morioka, N., et al., "Practical Development of Control Technology for the More Electric Engine," *IHI Engineering Review*, vol. 45, No. 1, 2012, pp. 21-30 in English Language.

* cited by examiner

FUEL SYSTEM

This application is a continuation application based on a PCT Patent Application No. PCT/JP2014/050468, filed Jan. 14, 2014, whose priority is claimed on Japanese Patent Application No. 2013-007755, filed Jan. 18, 2013. The contents of both the PCT application and the Japanese Patent Application are incorporated herein by reference.

TECHNICAL FIELD

The present disclosure relates to a fuel system.

BACKGROUND ART

For example, there is a fuel system is equipped with an aircraft or a jet engine of an aircraft. The fuel system includes a constant-volume fuel pump that boosts the pressure of fuel to a pressure suitable for the jet engine and supplies the fuel discharged from the fuel pump to the jet engine.

In order to prevent cavitation in the fuel pump, the fuel system is provided with a centrifugal pump that boosts a pressure of fuel, which is supplied to the fuel pump, to an extent to which cavitation does not occur in the fuel pump.

In the related art, the fuel pump and the centrifugal pump are connected to the jet engine and boosting power is input thereto from the jet engine. That is, drive shafts of the fuel pump and the centrifugal pump are connected to a turbine shaft of the jet engine via an accessory gear box and the drive shafts rotate with power generated from the jet engine.

In the constant-volume fuel pump, a discharge flow rate varies depending on a speed of revolution of the drive shaft.

Though the fuel pump is driven by the jet engine, the driving speed of the engine is not always suitable to the fuel pump operation. Accordingly, the speed of revolution of rotary power input to the fuel pump depends on the output of the jet engine and normally ranges from 70% to 100% of the speed of revolution in a substantially rated operation. As a result, even when the fuel flow rate required for the jet engine side is small, fuel of a large flow rate is normally discharged from the fuel pump. Accordingly, the fuel system according to the related art is provided with a circulation flow channel including the fuel pump and a fuel control unit discharging fuel of only a flow rate required for the jet engine side from the circulation flow channel. In the fuel system according to the related art, fuel of a large flow rate discharged from the fuel pump circulates in the circulation flow channel and only a required amount of fuel thereof is supplied to the jet engine by the fuel control unit.

In the fuel system according to the related art, since an amount of fuel (extra fuel) equal to or greater than the flow rate required for the jet engine circulates, extra power is consumed. Therefore, recently, a configuration in which a drive system of a fuel pump is separated from a jet engine and an electric motor is connected to the fuel pump has been proposed as disclosed in Non Patent Document 1. According to this configuration, the speed of revolution of the fuel pump can be varied depending on the fuel flow rate required for the jet engine side and it is not necessary to cause extra fuel to circulate. As a result, it is possible to suppress extra power consumption to improve the efficiency of the jet engine. Since the fuel control unit or the accessory gear box is not necessary, it is possible to achieve a decrease in the weight of an aircraft body.

DOCUMENT OF RELATED ART

Non Patent Document

[Non Patent Document 1]
IHI Technical Report, vol. 52, First Edition, P43 to P52

SUMMARY

Technical Problem

In addition to the above-mentioned motorization of the fuel pump, motorization of the centrifugal pump disposed upstream from the fuel pump has been attempted. However, unlike the electric motor for driving the fuel pump, when an electric motor for driving the centrifugal pump is provided, the merit of a decrease in weight due to the needlessness of the fuel control unit or the accessory gear box is cancelled.

Accordingly, for example, when a constant-volume pump is used as a fuel pump and a centrifugal pump is used as a boost pump, driving of the fuel pump and the centrifugal pump using a single electric motor can be considered. In this case, since the speed of revolution of the electric motor is determined depending on the amount of fuel discharged from the fuel pump, the speed of revolution of the centrifugal pump depends on the speed of revolution rotary power input to the fuel pump. In consideration of a variation width of a fuel flow rate supplied to a jet engine in an aircraft or the like, it is presumed that the speed of revolution (that is, the speed of revolution of the electric motor) of the rotary power input to the fuel pump varies in a range of 3% to 100% of the speed of revolution in a rated operation. However, in a turbo pump such as a centrifugal pump, a discharge pressure is proportional to the square of the speed of revolution.

Accordingly, in revolution at about 3% of the rotation speed in the rated operation, the boosting of a pressure of fuel due to the centrifugal pump cannot be expected and the effect of preventing cavitation in the fuel pump cannot be expected.

The Embodiments described herein was conceived in view of the above-described circumstances and an object of the present disclosure is to boost a pressure of fuel supplied to a fuel pump without receiving power directly from a jet engine and without increasing the number of electric motors in a fuel system that supplies fuel to the jet engine.

Solution to Problem

The present disclosure employs the following configurations as means for solving the above-mentioned problem.

According to a first aspect of the present disclosure, there is provided a fuel system which supplies fuel to a jet engine, including: a fuel pump that is formed of a constant-volume pump for changing a discharge flow rate in conjunction with a variation in the speed of revolution of a drive shaft; a boost pump that is disposed upstream from the fuel pump and that is formed of a constant-volume pump of which a discharge flow rate per unit of revolution of a drive shaft is greater than that of the fuel pump; a single electric motor that rotationally drives the drive shaft of the fuel pump and the drive shaft of the boost pump in a state in which the speeds of revolution thereof are equal to each other; a return flow channel that connects an upstream side and a downstream side of the boost pump; and a relief valve that is disposed in the return flow channel and that is opened when an internal pressure of the return flow channel is greater than a reference pressure.

A second aspect of the present disclosure provides the fuel system according to the first aspect, wherein the fuel pump and the boost pump are gear pumps.

A third aspect of the present disclosure provides the fuel system according to the first or second aspect, wherein the boost pump is a three-stranded gear pump having two boost sections, and the fuel system includes a first switching mechanism that is switched between a state in which the two boost sections are connected in series and a state in which the two boost sections are connected in parallel.

A fourth aspect of the present disclosure provides the fuel system according to the first or second aspect, including: an accessory pump that is disposed in parallel with the boost pump; and a second switching mechanism that is switched between a state in which the boost pump and the accessory pump are connected in series and a state in which the boost pump and the accessory pump are connected in parallel.

A fifth aspect of the present disclosure provides the fuel system according to the fourth aspect, wherein the accessory pump is rotationally driven by the electric motor.

Effects of the Disclosure

According to the present disclosure, the boost pump formed of a constant-volume pump is disposed upstream from the fuel pump and is driven along with the fuel pump by the single electric motor. The amount of fuel discharged per unit of revolution of the boost pump is set to be greater than that of the fuel pump. Accordingly, when the fuel pump and the boost pump are driven by the electric motor, the amount of fuel discharged from the fuel pump is normally greater than the amount of fuel discharged from the boost pump regardless of the speed of revolution of the electric motor and the pressure of fuel is boosted between the boost pump and the fuel pump. As a result, fuel supplied to the fuel pump is normally maintained in a boosted state. When the pressure of fuel supplied to the fuel pump is greater than the reference pressure (for example, a pressure defined not to cause cavitation in the fuel pump), the relief valve is opened to return fuel upstream from downstream from the boost pump via the return flow channel. Accordingly, the pressure of fuel supplied to the fuel pump can be normally stabilized at a constant pressure. According to the present disclosure, it is possible to boost a pressure of fuel supplied to a fuel pump without receiving power directly from a jet engine and without increasing the number of electric motors in a fuel system that supplies fuel to the jet engine.

DESCRIPTION OF EMBODIMENTS

Hereinafter, a fuel system according to embodiments of the present disclosure will be described with reference to the accompanying drawings. In the following drawings, scales of constituent members are appropriately changed in order to enable the constituent members to be recognized.

First Embodiment

Figure 1:
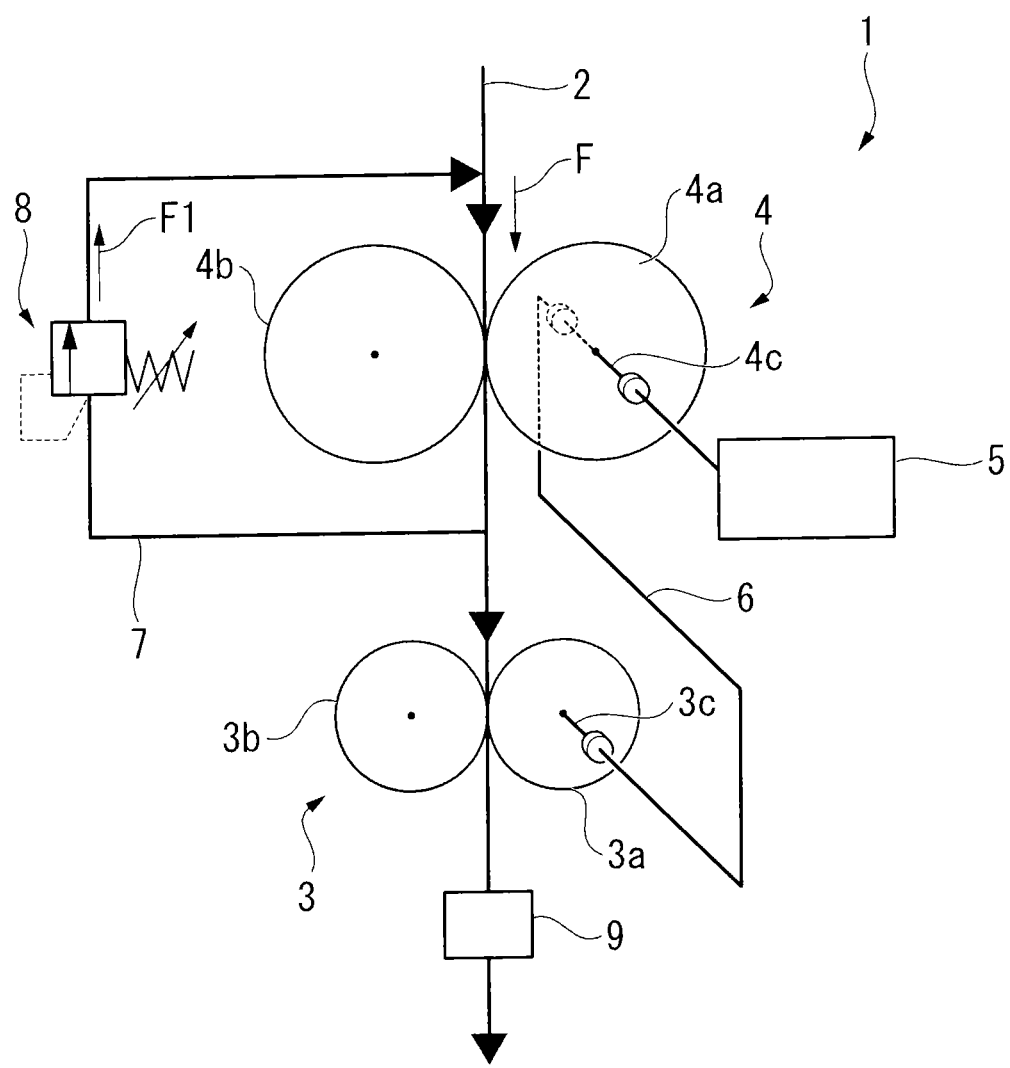
FIG. 1 is a schematic diagram showing a schematic configuration of a fuel system according to a first embodiment of the present disclosure.

FIG. 1 is a schematic diagram showing a schematic configuration of a fuel system 1 according to this embodiment. As shown in the drawing, the fuel system 1 according to this embodiment includes a main flow channel 2, a fuel pump 3, a boost pump 4, an electric motor 5, a shaft 6, a return flow channel 7, a relief valve 8, and a flowmeter 9.

The main flow channel 2 is a flow channel that connects a fuel tank (not shown) of an aircraft to a fuel nozzle (not shown) of a jet engine and guides fuel F from the fuel tank to the fuel nozzle. The fuel pump 3 is disposed in the middle of the main flow channel 2 and is formed of a gear pump (constant-volume pump) including a gear $3a$ and a gear $3b$ which engage with each other. The fuel pump 3 includes a drive shaft $3c$ and a housing (not shown) in addition to the gear $3a$ and the gear $3b$. In FIG. 1, the gear $3a$ and the gear $3b$ are schematically shown and are thus shown in a circular shape, but the gear $3a$ and the gear $3b$ actually have a gear shape. The drive shaft $3c$ is connected to the center of the gear $3a$ and is connected to the electric motor 5 via the shaft 6 and a drive shaft $4c$ to be described later of the boost pump 4. Accordingly, the gear $3a$ is directly rotated by the electric motor 5. On the other hand, the gear $3b$ is rotated to follow the rotation of the gear $3a$. That is, the gear $3a$ is a driving gear and the gear $3b$ is a driven gear. The housing accommodates the gear $3a$ and the gear $3b$ and includes a flow channel connected to an accommodation space of the gear $3a$ and the gear $3b$. In the fuel pump 3, the pressure of the fuel F is boosted to a pressure suitable for supply to the fuel nozzle of the jet engine between the gears $3a$ and $3b$ and the inner wall surface of the housing and then the fuel F is discharged from the housing. Since the fuel pump 3 is a constant-volume pump, the discharge flow rate is changed depending on the speed of revolution of the drive shaft $3c$ (that is, the rotation speed of the gear $3a$ and the gear $3b$). For example, the discharge flow rate increases when the speed of revolution decreases and the discharge flow rate increases when the speed of revolution increases.

The boost pump 4 is disposed in the middle of the main flow channel 2 and is disposed upstream from the fuel pump 3. The boost pump 4 is formed of a gear pump (constant-volume pump) including a gear $4a$ and a gear $4b$ which engage with each other. The boost pump 4 includes a drive shaft $4c$ and a housing (not shown) in addition to the gear $4a$ and the gear $4b$. The gear $4a$ and the gear $4b$ of the boost pump 4 have a diameter greater than that of the gear $3a$ and the gear 3*b* of the fuel pump 3. In FIG. 1, the gear 4*a* and the gear 4*b* are schematically shown and are thus shown in a circular shape, but the gear 4*a* and the gear 4*b* actually have a gear shape. The drive shaft 4*c* is connected to the center of the gear 4*a* and is connected to the electric motor 5. Accordingly, the gear 4*a* is directly rotated by the electric motor 5. On the other hand, the gear 4*b* is rotated to follow the rotation of the gear 4*a*. That is, the gear 4*a* is a driving gear and the gear 4*b* is a driven gear. The housing accommodates the gear 4*a* and the gear 4*b* and includes a flow channel connected to an accommodation space of the gear 4*a* and the gear 4*b*. Since the boost pump 4 is a constant-volume pump, the discharge flow rate is changed depending on the speed of revolution of the drive shaft 4*c* (that is, the rotation speed of the gear 4*a* and the gear 4*b*) similarly to the fuel pump 3.

The boost pump 4 includes the gear 4*a* and the gear 4*b* having a diameter greater than that of the gear 3*a* and the gear 3*b* of the fuel pump 3, and thus discharges an amount of the fuel F greater than the fuel pump 3 when the gear 3*a* and the gear 4*a* which are the driving gears are rotated. That is, the boost pump 4 is a constant-volume pump in which the discharge flow rate per unit of revolution of the drive shaft 4*c* is greater than that of the fuel pump 3. It is preferable that the discharge flow rate of the boost pump 4 be 1.45 times the discharge flow rate of the fuel pump 3 or more.

The electric motor 5 is directly connected to the drive shaft 4*c* of the boost pump 4 and is indirectly connected to the drive shaft 3*c* of the fuel pump 3 via the shaft 6. The electric motor 5 rotationally drives the drive shaft 4*c* of the boost pump 4 and the drive shaft 3*c* of the fuel pump 3 in a state in which the speeds of revolution thereof are equal to each other. The electric motor 5 is electrically connected to an engine control unit (ECU) (not shown) mounted on an aircraft and the speed of revolution thereof is controlled such that the flow rate of fuel discharged from the fuel pump 3 reaches a necessary flow rate under the control of the ECU. For example, a servo motor is used as the electric motor 5.

Figure 2A:
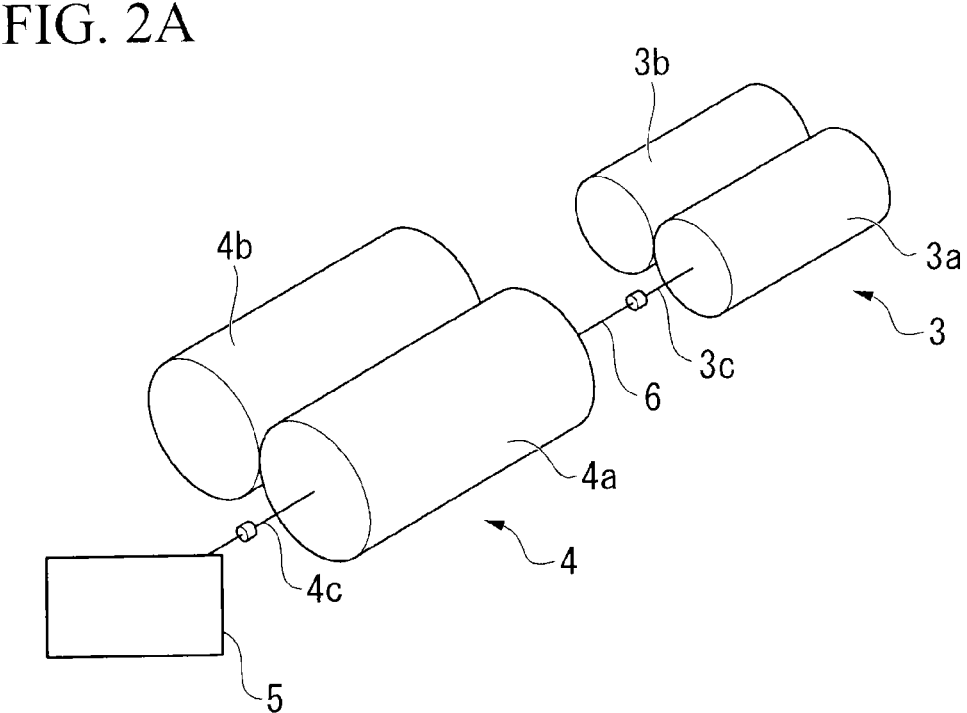
FIG. 2A is a schematic perspective view showing an arrangement relationship between a fuel pump and a boost pump.
Figure 2B:
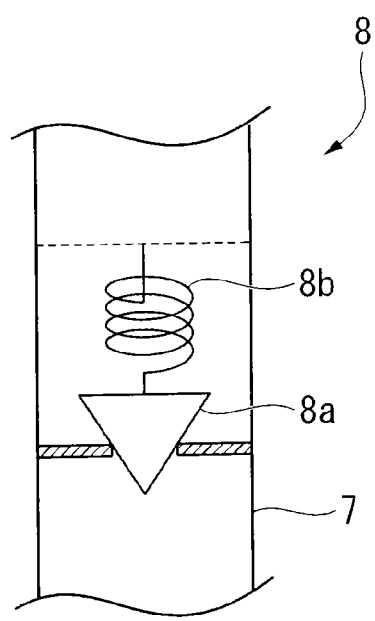
FIG. 2B is a cross-sectional view of a relief valve.

The shaft 6 connects the drive shaft 4*c* of the boost pump 4 and the drive shaft 3*c* of the fuel pump 3 and transmits rotary power generated from the electric motor 5 to the drive shaft 3*c* of the fuel pump 3. In FIG. 1, the shaft 6 is shown to be bent. However, actually, as shown in FIG. 2A, the fuel pump 3 and the boost pump 4 are arranged such that the axial direction of the drive shaft 3*c* and the axial direction of the drive shaft 4*c* correspond to each other, and the shaft 6 is a straight rod-like member and connects the drive shaft 3*c* and the drive shaft 4*c*.

The return flow channel 7 is a flow channel connecting the downstream side of the boost pump 4 and the upstream side of the boost pump 4, one end thereof is connected to the main flow channel 2 between the boost pump 4 and the fuel pump 3, and the other end thereof is connected to the main flow channel 2 on the upstream side of the boost pump 4. The return flow channel 7 returns a surplus of the fuel F (hereinafter referred to as extra fuel F1) discharged from the boost pump to the upstream side of the boost pump 4. The extra fuel F1 is the fuel F with which the internal pressure between the boost pump 4 and the fuel pump 3 is greater than a predetermined reference pressure.

The relief valve 8 is disposed in the middle of the return flow channel 7. The relief valve 8 includes a valve 8*a* that opens and closes the return flow channel 7 and a spring 8*b* that energizes the valve 8*a* in a direction in which the return flow channel 7 is closed. The spring 8*b* energizes the valve 8*a* with an energizing force equal to a pressing force which is applied to the valve 8*a* when the internal pressure of the return flow channel 7 (that is, the internal pressure between the boost pump 4 and the fuel pump 3) is the reference pressure. The relief valve 8 is configured to open the return flow channel 7 to allow the extra fuel F1 to flow when the internal pressure of the return flow channel 7 is greater than the reference pressure.

The reference pressure is a pressure determined such that cavitation does not occur in the fuel pump 3 and is determined in the step of designing the fuel system 1. The internal pressure of the return flow channel 7 (that is, the internal pressure between the boost pump 4 and the fuel pump 3) is determined by the energizing force of the spring 8*b* of the relief valve 8. Accordingly, the spring constant of the spring 8*b* is set such that the valve 8*a* moves when the internal pressure of the return flow channel 7 (that is, the internal pressure between the boost pump 4 and the fuel pump 3) is greater than the reference pressure.

The flowmeter 9 is disposed in the middle of the main flow channel 2 on the downstream side of the fuel pump 3. The flowmeter 9 measures the flow rate of the fuel F discharged from the fuel pump 3 and outputs the measured value to the ECU or the like (not shown).

The operation of the fuel system 1 according to this embodiment having the above-mentioned configuration will be described below. When the electric motor 5 shown in FIG. 1 is driven, rotary power is generated from the electric motor 5. Since the speed of revolution (the discharge flow rate) of the fuel pump 3 is determined depending on the speed of revolution of the electric motor 5, the speed of revolution of the electric motor 5 is determined based on the flow rate of fuel to be discharged from the fuel pump 3. When the rotary power is generated from the electric motor 5 in this way, the rotary power is transmitted to the drive shaft 3*c* of the fuel pump 3 and the drive shaft 4*c* of the boost pump 4. Accordingly, the drive shaft 3*c* of the fuel pump 3 and the drive shaft 4*c* of the boost pump 4 are rotationally driven in a state in which the speeds of revolution are equal to each other.

Figure 3:
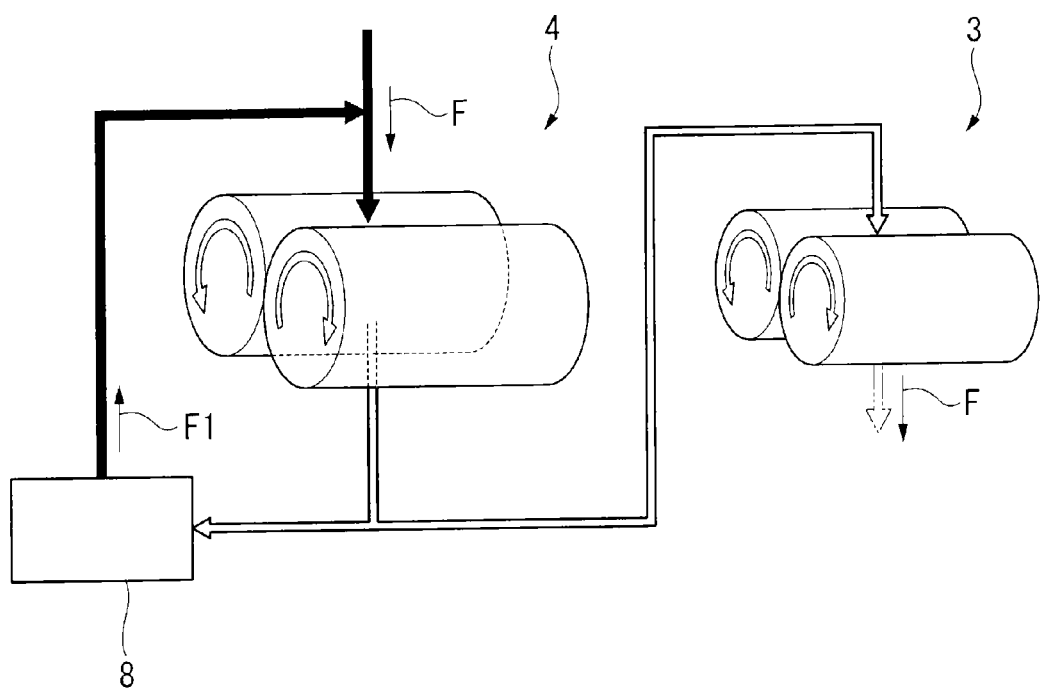
FIG. 3 is a schematic diagram showing an operation of the fuel system according to the first embodiment of the present disclosure.

As shown in the schematic diagram of FIG. 3, when the drive shaft 4*c* of the boost pump 4 is rotationally driven, the gear 4*a* and the gear 4*b* are rotationally driven, and thus the fuel F supplied to the boost pump 4 is boosted and is then discharged. Since the drive shaft 3*c* of the fuel pump 3 is also rotationally driven, the gear 3*a* and the gear 3*b* are rotationally driven and thus the fuel F supplied from the boost pump 4 to the fuel pump is boosted to a pressure suitable for a spray from the fuel nozzle.

In the fuel system according to this embodiment, the discharge flow rate per unit of revolution of the drive shaft is greater in the boost pump 4 than in the fuel pump 3. Accordingly, the fuel F is pressed between the boost pump 4 and the fuel pump 3 and the internal pressure between the boost pump 4 and the fuel pump 3 increases. When the internal pressure between the boost pump 4 and the fuel pump 3 is greater than the reference pressure, the relief valve 8 is opened to return the extra fuel F1. Accordingly, the internal pressure between the boost pump 4 and the fuel pump 3 is normally maintained at the reference pressure. Accordingly, the fuel pump 3 is normally supplied with the fuel F of the reference pressure.

The operation and effects of the fuel system 1 according to this embodiment will be described below. In the above-mentioned fuel system 1 according to this embodiment, the boost pump 4 formed of a constant-volume pump is disposed upstream from the fuel pump 3 and is driven along with the fuel pump 3 by the single electric motor 5. The amount of fuel discharged per unit of revolution of the boost pump 4 is set to be greater than that of the fuel pump 3. Accordingly, when the fuel pump 3 and the boost pump 4 are driven by the electric motor 5, the amount of fuel discharged from the fuel pump 3 is normally greater than the amount of fuel discharged from the boost pump 4 regardless of the speed of revolution of the electric motor 5 and the pressure of the fuel F is boosted between the boost pump 4 and the fuel pump 3. As a result, the fuel F supplied to the fuel pump 3 is normally maintained in a boosted state. When the pressure of the fuel F supplied to the fuel pump 3 is greater than the reference pressure, the relief valve 8 is opened to return the fuel F from downstream from the boost pump 4 upstream via the return flow channel 7. Accordingly, the pressure of the fuel F supplied to the fuel pump 3 can be normally stabilized at a constant pressure. In the fuel system 1 according to this embodiment, it is possible to boost a pressure of the fuel F supplied to the fuel pump 3 without receiving power directly from a jet engine and without increasing the number of electric motors 5.

In the fuel system 1 according to this embodiment, the fuel pump 3 and the boost pump 4 are gear pumps. The gear pump has high durability against contamination due to attachment of foreign substances. Accordingly, it is possible to provide a fuel system 1 with high reliability.

In the fuel system 1 according to this embodiment, the relief valve 8 includes the valve 8a that opens and closes the return flow channel 7 and the spring 8b that energizes the valve 8a with the same energizing force equal to the pressing force applied to the valve 8a at the reference pressure. Accordingly, it is not necessary to install a particular power source for driving the relief valve 8.

In the fuel system 1 according to this embodiment, it is preferable that the discharge flow rate per unit of revolution of the drive shaft in the boost pump 4 be 1.45 times the discharge flow rate in the fuel pump 3 or more. Particularly, in an aircraft, for a certain reason, it is necessary to prevent cavitation in the fuel pump 3 and to supply fuel to the fuel nozzle even in an emergency in which a VL ratio (ratio of vapor and liquid) of the fuel F supplied to the fuel system 1 increases. Accordingly, even in a state in which the VL ratio is 0.45, standards require that cavitation be prevented in the fuel pump 3. By setting the discharge flow rate per unit of revolution of the drive shaft in the boost pump 4 to be 1.45 times that in the fuel pump 3 or more, it is possible to boost the pressure of the fuel F at a VL ratio of 0.45 and to prevent cavitation in the fuel pump 3. However, the amount of heat emitted and the weight increase with an increase in size of the boost pump 4, and energy loss in a normal state increases. Accordingly, it is preferable that the discharge flow rate from the boost pump 4 be set to 1.45 times that in the fuel pump 3 or to be in a range which is not much greater than 1.45 times.

Second Embodiment

A second embodiment of the present disclosure will be described below. In the description of the second embodiment, description of elements similar to those in the first embodiment will not be repeated or will be made in brief.

Figure 4:
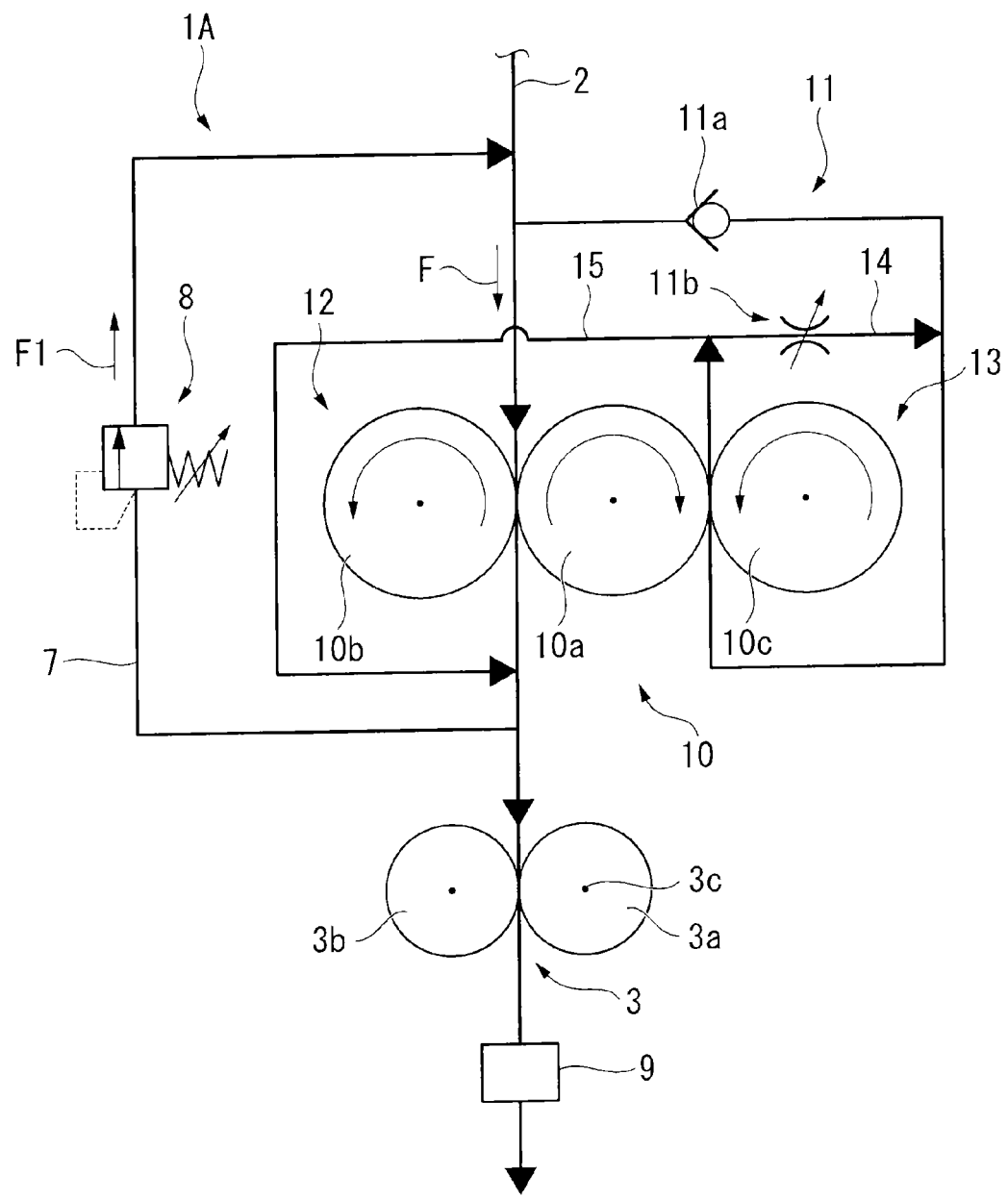
FIG. 4 is a schematic diagram showing a schematic configuration of a fuel system according to a second embodiment of the present disclosure.

FIG. 4 is a schematic diagram showing a schematic configuration of a fuel system 1A according to this embodiment. As shown in the drawing, the fuel system 1A according to this embodiment includes a three-stranded boost pump 10 and a flow rate switching unit 11 (first switching mechanism) instead of the two-stranded boost pump 4 of the fuel system 1 according to the first embodiment. In FIG. 4, the electric motor 5 and the shaft 6 are not shown.

The boost pump 10 includes a gear 10a, a gear 10b, a gear 10c, and a casing (not shown). The gears 10a to 10c are accommodated in the casing (not shown) in an engaged state. The gear 10b and the gear 10c are disposed to face each other with the gear 10a interposed therebetween. In the following description, the direction in which the gear 10b and the gear 10c face each other is referred to as a gear facing direction. The electric motor 5 is connected to the gear 10a.

The gear 10a rotates with a torque supplied from the electric motor 5. The gear 10b and the gear 10c are driven gears which rotate by engagement with the gear 10a. That is, the electric motor 5 rotationally drives the gear 10b through the gear 10a.

The fuel F is confined in a space surrounded by the gears 10a to 10c and the internal wall surface of the casing (not shown) and is transported to the downstream side. A first pump section 12 (boost section) of the gear 10a is constituted to include almost a half of the gear 10b side in the gear facing direction. Similarly, a second pump section 13 (boost section) of the gear 10a is constituted to include almost a half of the gear 10c side in the gear facing direction.

The first pump section 12 and the second pump section 13 each function as a two-stranded gear pump. The total amount of fuel discharged from the first pump section 12 and the second pump section 13 is the amount of fuel discharged from the boost pump 10.

When the gear 10a and the gear 10b rotate, the fuel F is pressurized by the first pump section 12 and is discharged to the downstream side. The flow channel and the amount of the fuel F discharged via the second pump section 13 will be described with the configuration of the flow rate switching unit 11.

The flow rate switching unit 11 according to this embodiment includes a check valve 11a and a variable throttle 11b. The check valve 11a is disposed in a flow channel branched from the main flow channel 2 on the upstream side of the boost pump 10. The check valve 11a prevents the fuel F from flowing from the downstream side to the upstream side of the check valve 11a. The fuel F passing through the check valve 11a flows into the second pump section 13. The discharge-side flow channel of the second pump section 13 is branched into a bypass flow channel 14 and a discharge flow channel 15. The downstream side of the bypass flow channel 14 joins the introduction side of the second pump section 13 and the check valve 11a. The downstream side of the discharge flow channel 15 joins the discharge side of the first pump section 12.

The variable throttle 11b is disposed in the bypass flow channel 14. The variable throttle 11b adjusts a ratio (hereinafter referred to as an aperture ratio) of the amount of the fuel F flowing in the bypass flow channel 14 to the amount of the fuel F discharged from the second pump section 13. The variable throttle 11b monitors the pressure of the fuel F before and after passing through the variable throttle 11b and adjusts the aperture ratio which is a degree of adjustment by the variable throttle.

Figure 5:
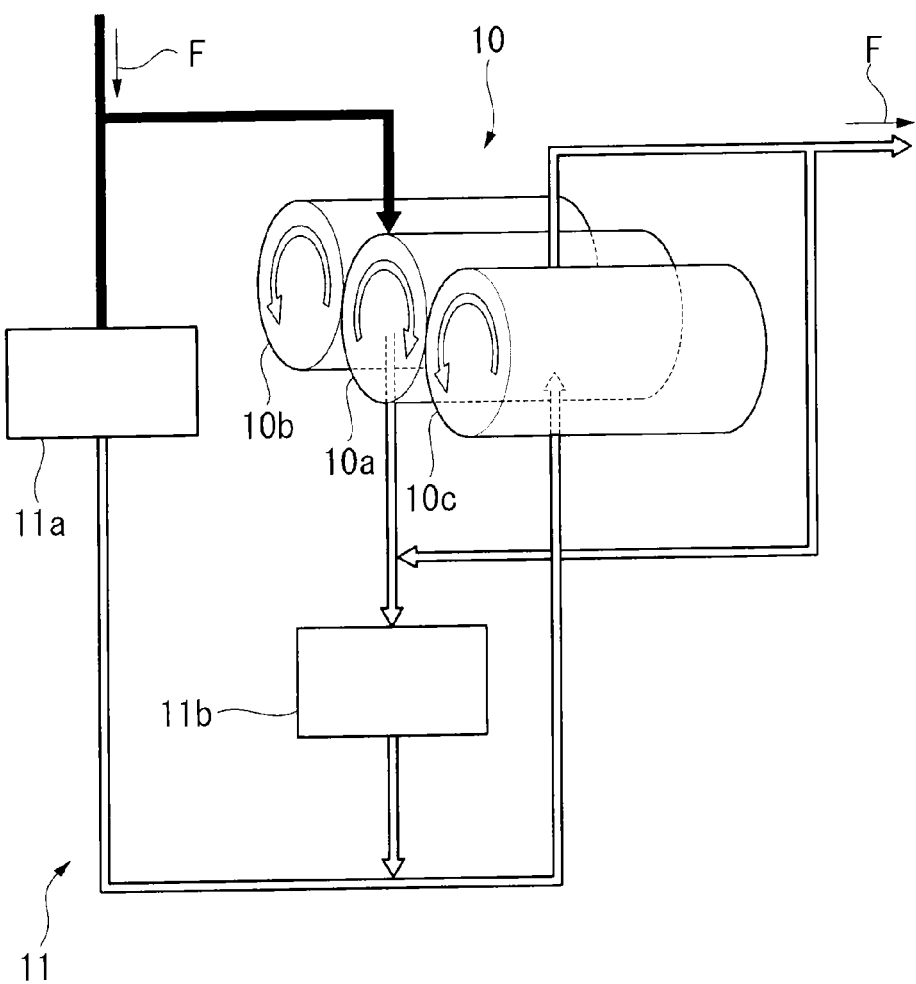
FIG. 5 is a schematic diagram showing an operation of the fuel system according to the second embodiment of the present disclosure.

When the aperture ratio of the variable throttle 11b is the minimum (completely closed), most fuel F discharged from the second pump section 13 passes through the discharge flow channel 15 and is discharged from the boost pump 10 along with the fuel F discharged from the first pump section 12. At this time, the actual amount of fuel discharged from the second pump section 13 is almost equal to the amount of fuel discharged from the first pump section 12. In this case, as shown in the schematic diagram of FIG. 5, the first pump section 12 and the second pump section 13 are connected in series.

Figure 6:
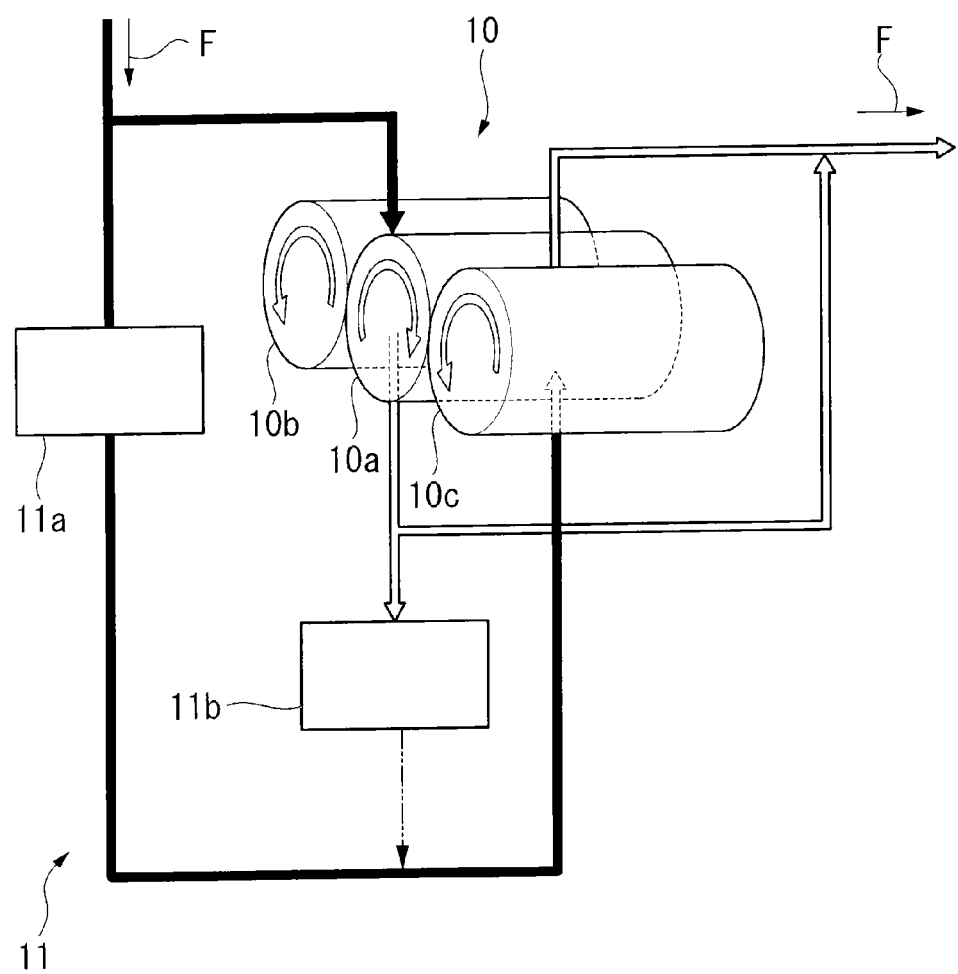
FIG. 6 is a schematic diagram showing an operation of the fuel system according to the second embodiment of the present disclosure.

When the aperture ratio of the variable throttle 11b is the maximum (completely opened), most fuel F discharged from the second pump section 13 passes through the bypass flow channel 14 and is returned to the introduction side of the second pump section 13. At this time, the check valve 11a is closed and the fuel F does not flow from the main flow channel 2 to the second pump section 13. The second pump section 13 hardly works for the fuel F and hardly contributes to the amount of fuel discharged from the boost pump 10. That is, the actual amount of fuel discharged from the second pump section 13 is substantially zero. In this case, as shown in the schematic diagram of FIG. 6, the first pump section 12 and the second pump section 13 are connected in parallel.

In the fuel system 1A according to this embodiment, when the variable throttle 11b is completely opened, the first pump section 12 and the second pump section 13 are connected in series and the discharge flow rate decreases. When the variable throttle 11b is completely closed, the first pump section 12 and the second pump section 13 are connected in parallel and the discharge flow rate increases. In the fuel system 1A according to this embodiment, the discharge flow rate of the boost pump 10 per unit of revolution of the drive shaft (unit of revolution of the gear 10a) when the first pump section 12 and the second pump section 13 are connected in series is set to be greater than that of the fuel pump 3.

In the fuel system 1A according to this embodiment, the discharge flow rate of the boost pump 10 is made to be greater than that of the fuel pump 3 by connecting the first pump section 12 and the second pump section 13 in series in a normal state, and the discharge flow rate of the boost pump 10 is made to increase so as to cope with the increase of the VL ratio by connecting the first pump section 12 and the second pump section 13 in an emergency. Accordingly, the discharge flow rate from the boost pump 10 is made to greatly increase only in an emergency in which the VL ratio increases, and it is thus possible to reduce energy loss in the normal state.

While exemplary embodiments of the present disclosure have been described with reference to the accompanying drawings, the present disclosure is not limited to the embodiments. Various shapes and combinations of various constituent members described in the above-mentioned embodiments are only examples and can be modified in various forms depending on design requirements without departing from the gist of the present disclosure.

For example, in the above-mentioned embodiments, a configuration in which the fuel pump 3 and the boost pumps 4 and 10 are gear pumps has been described. However, the present disclosure is not limited to this configuration, and any constant-volume pump may be used as the fuel pump and the boost pump. For example, a plunger pump or a vane pump may be used as the fuel pump and the boost pump.

In the first embodiment, a configuration in which the drive shaft 3c of the fuel pump 3 and the drive shaft 4c of the boost pump 4 are connected using the shaft 6 has been described. However, the present disclosure is not limited to this configuration and a structure in which the drive shaft 3c and the drive shaft 4c are directly connected to each other may be employed.

Figure 7A:
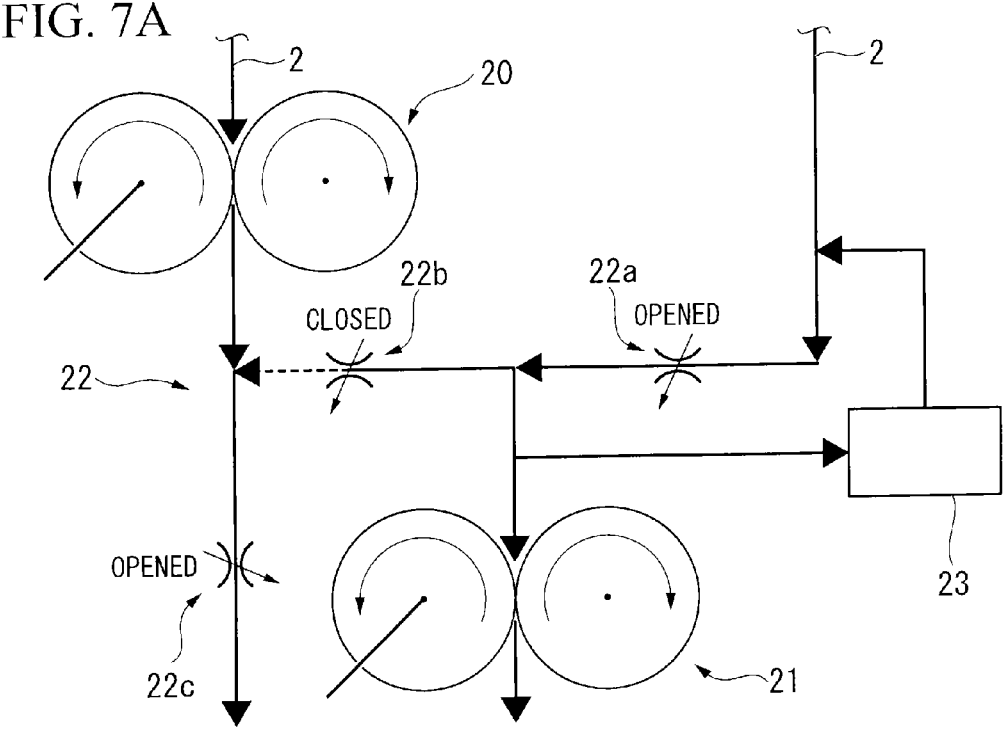
FIG. 7A is a schematic diagram showing a schematic configuration of a modification example of the fuel system according to the second embodiment of the present disclosure.
Figure 7B:
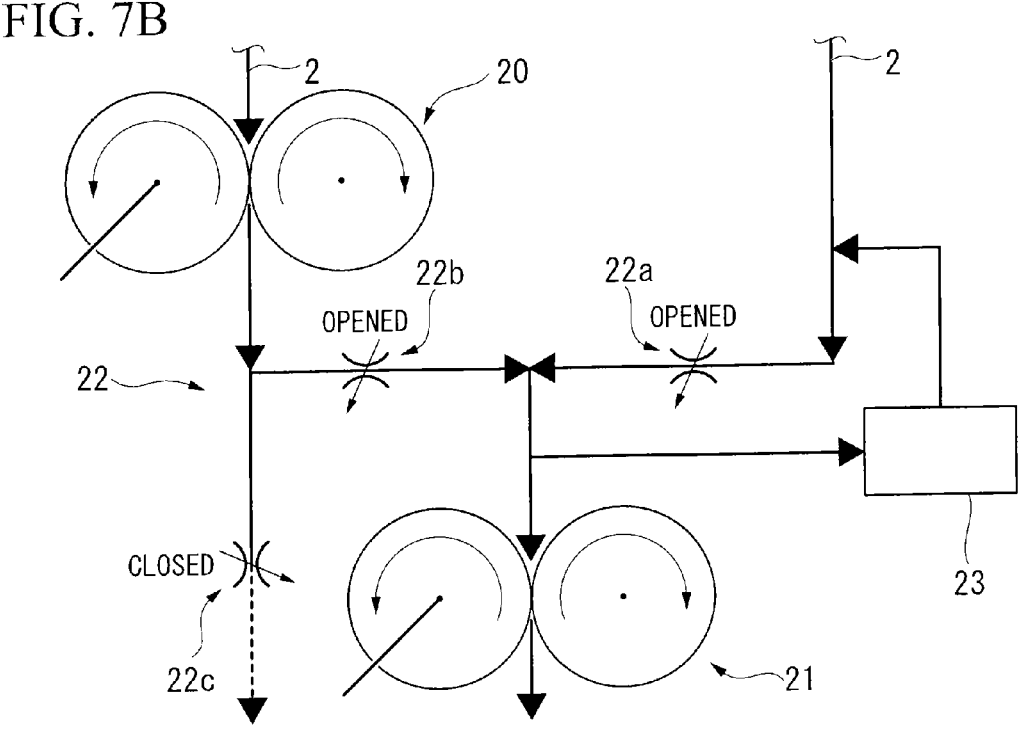
FIG. 7B is a schematic diagram showing a schematic configuration of a modification example of the fuel system according to the second embodiment of the present disclosure.

In the second embodiment, a configuration in which the flow rate is switched using the boost pump 4 formed of a three-stranded gear pump has been described. However, the present disclosure is not limited to this configuration, and for example, as shown in FIGS. 7A and 7B, a constant-volume accessory pump 21 may be installed in parallel to a boost pump 20 formed of a two-stranded gear pump and the connection state of the boost pump 20 and the accessory pump 21 may be switched between a serial-connected state and a parallel-connected state using a switching mechanism 22 (second switching mechanism) including a switching valve 22a, a switching valve 22b, and a switching valve 22c. Specifically, as shown in FIG. 7A, by opening the switching valve 22a, closing the switching valve 22b, and opening the switching valve 22c, the boost pump 20 and the accessory pump 21 are connected in parallel and the discharge flow rate increases. As shown in FIG. 7B, by opening the switching valve 22a, closing the switching valve 22b, and closing the switching valve 22c, the boost pump 20 and the accessory pump 21 are connected in series and the discharge flow rate decreases. According to this configuration, similarly to the second embodiment, it is possible to reduce the energy loss in the normal state by causing the discharge flow rate from the boost pump 10 to greatly increase only in an emergency in which the VL ratio increases. When the capacity of the accessory pump 21 is greater than the capacity of the boost pump 20, the relief valve 23 is adjusted such that the pressure between the boost pump 20 and the accessory pump 21 is higher than the pressure of the main flow channel 2. When the capacity of the accessory pump 21 is less than the capacity of the boost pump 20, the relief valve 23 is adjusted so as to decrease the pressure between the boost pump 20 and the accessory pump 21 (so as to be equal to the pressure of the main flow channel 2). It is preferable that the accessory pump 21 be rotationally driven by the electric motor 5. Accordingly, it is not necessary to separately provide a power source for driving the accessory pump.

INDUSTRIAL APPLICABILITY

According to the present disclosure, in a fuel system that supplies fuel to a jet engine, it is possible to boost a pressure of fuel supplied to a fuel pump without receiving power directly from the jet engine and without increasing the number of electric motors.

The invention claimed is:
1. A fuel system which supplies fuel to a jet engine, comprising:
 a fuel pump that is formed of a constant-volume pump for changing a discharge flow rate in conjunction with a variation in a speed of revolution of a drive shaft;
 a boost pump that is disposed upstream from the fuel pump and that is formed of a constant-volume pump of which a discharge flow rate per unit of revolution of a drive shaft is greater than that of the fuel pump;
 a single electric motor that rotationally drives the drive shaft of the fuel pump and the drive shaft of the boost pump in a state in which the speed of revolutions thereof are equal to each other;
 a return flow channel that connects an upstream side and a downstream side of the boost pump; and
 a relief valve that is disposed in the return flow channel and opened when an internal pressure of the return flow channel is greater than a reference pressure determined such that cavitation does not occur in the fuel pump.
2. The fuel system according to claim 1, wherein the fuel pump and the boost pump are gear pumps.
3. The fuel system according to claim 2, wherein the boost pump is a three-stranded gear pump having two boost sections, and wherein the fuel system comprises a first switching mechanism that is switched between a state in which the two boost sections are connected in series and a state in which the two boost sections are connected in parallel.

4. The fuel system according to claim 2, comprising:
an accessory pump that is disposed in parallel with the boost pump; and
a second switching mechanism that is switched between a state in which the boost pump and the accessory pump are connected in series and a state in which the boost pump and the accessory pump are connected in parallel.

5. The fuel system according to claim 4, wherein the accessory pump is rotationally driven by the single electric motor.

6. The fuel system according to claim 1, wherein the boost pump is a three-stranded gear pump having two boost sections, and wherein the fuel system comprises a first switching mechanism that is switched between a state in which the two boost sections are connected in series and a state in which the two boost sections are connected in parallel.

7. The fuel system according to claim 1, further comprising:
an accessory pump that is disposed in parallel with the boost pump; and
a second switching mechanism that is switched between a state in which the boost pump and the accessory pump are connected in series and a state in which the boost pump and the accessory pump are connected in parallel.

8. The fuel system according to claim 7, wherein the accessory pump is rotationally driven by the single electric motor.

* * * * *